United States Patent Office 3,130,232
Patented Apr. 21, 1964

3,130,232
AMIDINOHYDRAZONES OF CYCLIC
HALOVINYL ALDEHYDES
Leo A. Paquette, Portage Township, Kalamazoo County, Mich., assignor to The Upjohn Company, Kalamazoo, Mich., a corporation of Delaware
No Drawing. Filed Feb. 12, 1963, Ser. No. 257,878
6 Claims. (Cl. 260—564)

This invention relates to novel compositions of matter and to methods of preparing the same. It is particularly directed to novel amidinohydrazones of cyclic halovinyl aldehydes and to processes for the preparation of the same.

The novel compounds of the invention have the following formulas:

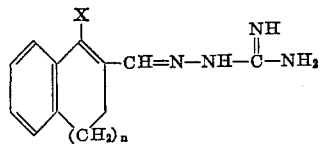

I and

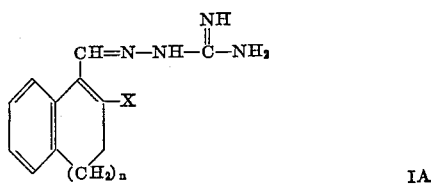

IA wherein X is selected from the group consisting of chlorine and bromine and $n$ is an integer from 1 to 2.

The novel compounds of the invention are prepared by reacting a cyclic halovinyl aldehyde selected from the group consisting of compounds having the formulas:

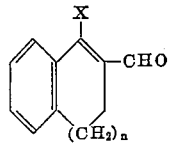

II and

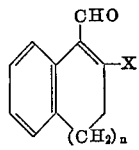

IIA wherein X and $n$ are as given above, with aminoguanidine, advantageously in the presence of an acid medium. The reaction can be carried out in inert media such as water (preferred), methanol, ethanol, and the like, including mixtures thereof with acid, preferably nitric acid. Illustratively, excellent results have been obtained using a 25% (by weight) solution of nitric acid in water. Other acids, for example, hydrochloric acid, sulfuric acid, and the like can also be employed. Aminoguanidine is commercially available in the form of its salts and for reaction purposes aminoguanidine bicarbonate is preferred, although other salts, for example, the hydrochloride, sulfate and the like can be used. Stoichiometrically the reaction requires equimolar amounts of aldehyde and aminoguanidine, although an excess of either reactant can be employed if so desired. Preferably, the aldehyde and aminoguanidine are employed in molar ratios ranging from about 1:1.5 to 1.5:1. Preferably, the reaction is carried out between about 0° C. and about 100° C., and more particularly between about 20° C. and about 75° C. Upon completion of the reaction, the amidinohydrazone acid addition salt can be isolated and purified by conventional procedures, e.g., filtration of the reaction mixture and recrystallization of the product thus obtained. The corresponding free base can be obtained by neutralizing the salt and recovering the base by conventional procedures.

The cyclic halovinyl aldehydes of Formula II can be prepared by reacting 3,4-dihydro-1(2H)naphthalenone (α-tetralone) or 6,7,8,9-tetrahydro-5H-cycloheptabenzen-5-one (benzsuberone) with a formylating agent consisting of dimethylformamide and a phosphorus halide such as phosphorus oxychloride or phosphorus oxybromide. See Ziegenbein et al., Chem. Ber. 93, 2743, 1960. The cyclic halovinyl aldehydes of Formula IIA can be prepared in the same manner, starting with 3,4-dihydro-2(1H)-naphthalenone (β-tetralone) or 5,7,8,9-tetrahydro-6H-cycloheptabenzen-6-one (Page et al., J. Am. Chem. Soc. 75, 2053, 1953).

The novel compounds of the invention have central nervous system depressant and anti-inflammatory activity and can be used for effecting sedation in and for allaying inflammation in mammals, birds, and other animals. They also decrease food intake, weight gain, food efficiency, and body fat in these animals and can be used for weight control. They also have antibacterial and antifungal activity, for example, against *Staphylococcus aureus, Streptococcus faecalis, Serratia marcescens, Aerobacter aerogenes, Salmonella schottmuelleri, Streptococcus lactis, Staphylococcus albus, Escherichia coli, Klebsiella pneumoniae, Salmonella gallinarum, Bacillus subtillis, Candida albicans, Trichophytron rubrum,* and *Microsporum canis,* and can be used for decontamination of surfaces contaminated with such bacteria and fungi.

The novel compounds of the invention are nitrogenous bases and as such can exist in both the protonated and non-protonated form according to the pH of the environment. The protonated forms can be isolated as acid addition salts which are useful in upgrading the free bases, that is, the nonprotonated form. Suitable acids for this purpose include nitric acid, hydrochloric acid, sulfuric acid, phosphoric acid, acetic acid, succinic acid, salicyclic acid, maleic acid, thiocyanic acid, fluosilicic acid, picric acid, Reinecke's acid, azobenzenesulfonic acid, and the like. As noted above, the acid addition salts frequently are obtained as initial reaction products, or they can be formed by neutralizing the free base with the appropriate acid or by metathesis. The novel compounds of the invention are also useful as intermediates. Thus, the condensation products obtained from the thiocyanic acid addition salts and formaldehyde according to U.S. Patents 2,425,320 and 2,606,155 are useful as pickling inhibitors. The fluosilicic acid addition salts are useful as mothproofing agents according to U.S. Patents 1,915,334 and 2,075,359. They are also useful in forming amine salts of penicillin of low solubility.

The invention may be more fully understood by reference to the following illustrative examples in which the parts and percentages are by weight unless otherwise specified.

EXAMPLE 1

1-Chloro-3,4-Dihydro-2-Naphthaldehyde Amidino-Hydrazone Nitrate

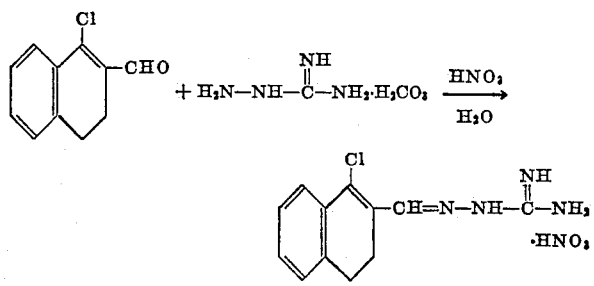

To a slurry of 15.0 g. (0.11 mole) of aminoguanidine bicarbonate in 75 ml. of water was slowly added 16.4 ml. of concentrated nitric acid. 1-chloro-3,4-dihydro-2-naphthaldehyde (20.7 g.; 0.10 mole) was then added in one portion and within several minutes a crystalline mass had formed. After the mixture had remained at about 25° C. for 2 hr., the solid was separated by filtration, washed successively with water, isopropanol, and diethyl ether, and dried. There was obtained 27.2 g. of nitrate salt, M.P. 254–255° C. (dec.). Two recrystallizations of this material from a large volume of aqueous ethanol gave 1-chloro-3,4-dihydro-2-naphthaldehyde amidinohydrazone nitrate as fluffy buff needles, M.P. 257° C. (dec.).

*Analysis.*—Calcd. for $C_{12}H_{14}ClN_5O_3$: C, 46.23; H, 4.53; N, 22.47. Found: C, 46.11; H, 4.39; N, 22.19.

EXAMPLE 2

9-Chloro-6,7-Dihydro-5H-Benzocycloheptene-8-Carboxaldehyde Amidinohydrazone Nitrate Following the procedure of Example 1, substituting 1-chloro-3,4-dihydro-2-naphthaledehyde by 9-chloro-6,7-dihydro-5H-benzocycloheptene-8-carboxaldehyde, there was obtained 9-chloro-6,7-dihydro - 5H - benzocycloheptene-8-carboxaldehyde amidinohydrazone nitrate.

By substituting 1-bromo-3,4-dihydro-2-naphthaldehyde and 9-bromo-6,7-dihydro - 5H - benzocycloheptene-8-carboxaldehyde in the above examples, there are obtained the amidinohydrazone nitrates of 1-bromo-3,4-dihydro-2-naphthaldehyde and 9-bromo-6,7-dihydro-5H-benzocycloheptene-8-carboxaldehyde.

EXAMPLE 3

2-Chloro-3,4-Dihydro-1-Naphthaldehyde Amidinohydrazone Nitrate

A. 2-CHLORO-3,4-DIHYDRO-1-NAPHTHALDEHYDE

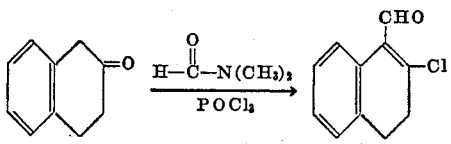

To a stirred solution of 30 g. of dimethylformamide in 100 ml. of trichloroethylene cooled in an ice bath was added 53 g. (0.346 mole) of phosphorus oxychloride below 10° C. When the addition was complete the ice bath was removed and the mixture was stirred for 0.5 hr. A solution of 50 g. (0.342 mole) of β-tetralone in 75 ml. of trichloroethylene was added below 60° C. with rapid stirring. The solution was stirred at 50–60° C. for 4 hr., cooled, and to it was cautiously added a solution of 125 g. of sodium acetate in 375 ml. of water. The layers were separated and the aqueous layer was extracted with diethyl ether. The combined organic layers were dried, filtered, and evaporated. The residue was distilled to give 29.0 g. of colorless liquid which rapidly darkened (red), B.P. 150–155° C. (15 mm.). This material, 2-chloro-3,4-dihydro - 1 - naphthaldehyde, crystallized as a white solid (pink supernatant) on standing.

B. 2-CHLORO-3,4-DIHYDRO-1-NAPHTHALDEHYDE AMIDINOHYDRAZONE NITRATE

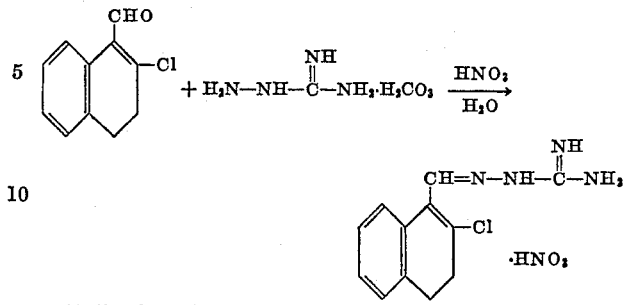

Following the procedure of Example 1, substituting the 1-chloro-3,4-dihydro-2-naphthaldehyde by the 2-chloro-3,4-dihydro-1-naphthaldehyde of part A, there was obtained 9.0 g. of yellowish solid, M.P. 164–167° C., which on recrystallization from ethanol-ether gave pure 2-chloro-3,4-dihydro-1-naphthaldehyde amidinohydrazone nitrate as white microneedles, M.P. 182° C. (dec.).

*Analysis.*—Calcd. for $C_{12}H_{14}ClN_5O_3$: C, 46.23; H, 4.53; N, 22.47. Found: C, 46.53; H, 4.74; N, 22.11.

Following the procedure of Example 3, substituting the β-tetralone by 5,7,8,9-tetrahydro-6H-cycloheptabenzen-6-one, there was obtained 8-chloro-6,7-dihydro-5H-benzocycloheptene-9-carboxaldehyde and its amidinohydrazone nitrate.

By substituting the phosphorus oxychloride in Example 3 by phosphorus oxybromide, the corresponding bromo compounds are obtained.

The nitrate salts produced according to the foregoing examples can be converted to the free bases by neutralization with alkali, for example, sodium or potassium hydroxide. The free bases can be converted to other acid addition salts by the procedures outlined above.

I claim:

1. A compound selected from the group consisting of compounds having the formula:

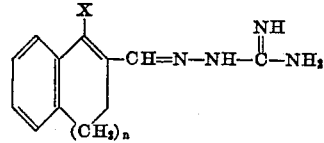

I and compounds having the formula:

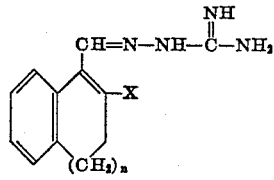

IA wherein X is selected from the group consisting of chlorine and bromine and n is an integer from 1 to 2.

2. An acid addition salt form of a compound of claim 1.

3. 1-chloro-3,4-dihydro-2-naphthaledhyde amidinohydrazone.

4. 1-chloro-3,4-dihydro-2-naphthaldehyde amidinohydrazone nitrate.

5. 2-chloro-3,4-dihydro-1-naphthaldehyde amidinohydrazone.

6. 2-chloro-3,4-dihydro-1-naphthaldehyde amidinohydrazone nitrate.

References Cited in the file of this patent

UNITED STATES PATENTS

| | | |
|---|---|---|
| 2,815,377 | Meiser et al. | Dec. 3, 1957 |
| 2,952,677 | Birtwell et al. | Sept. 13, 1960 |

OTHER REFERENCES

Lieber et al.: J. Org. Chem., vol. 17, pp. 518–522 (1952).